J. A. AYRES.
Operating Valves.
No. 163,134.  Patented May 11, 1875.
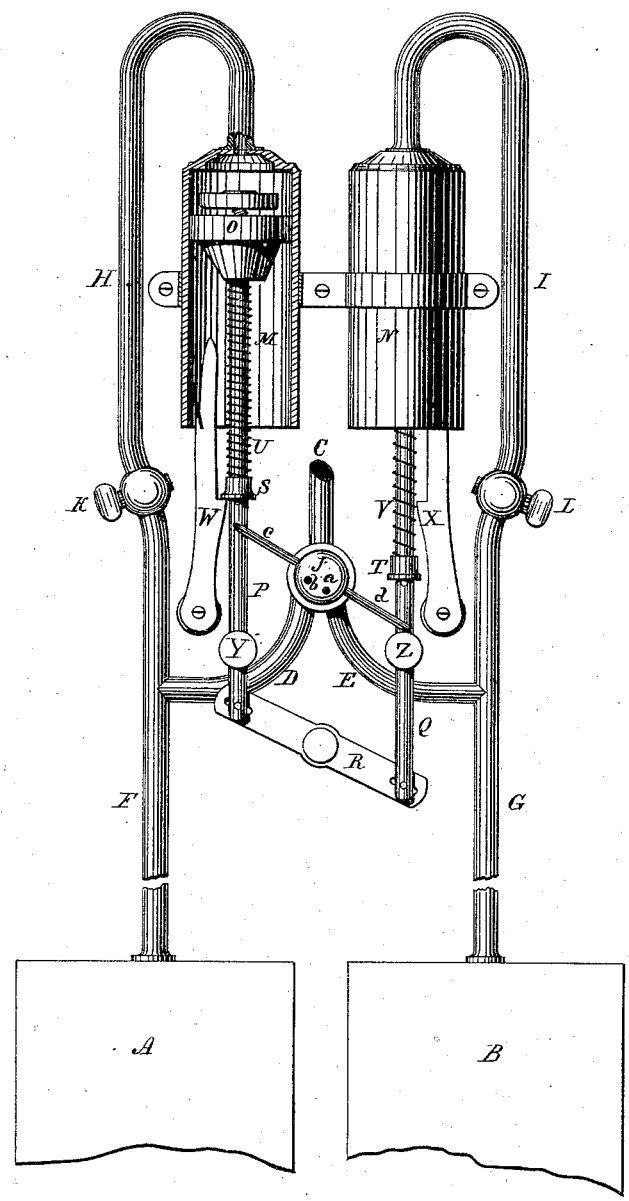

UNITED STATES PATENT OFFICE.

JARED A. AYRES, OF HARTFORD, CONNECTICUT.

IMPROVEMENT IN OPERATING VALVES.

Specification forming part of Letters Patent No. 163,134, dated May 11, 1875; application filed November 14, 1874.

*To all whom it may concern:*

Be it known that I, JARED A. AYRES, of Hartford, in the county of Hartford and State of Connecticut, have invented certain new and useful Improvements in Operating Valves; and I do hereby declare that the following is a full, clear, and exact description thereof, whereby a person skilled in the art can make and use the same, reference being had to the accompanying drawings and to the letters of reference marked thereon.

Like letters in the figures indicate the same parts.

My invention relates to that class of machines in which water is raised from two submerged chambers by the direct action of compressed air acting alternately in the two chambers. The object of my invention is to provide an automatic apparatus for operating the valve or cock which regulates the admission and escape of the compressed air, so that one chamber may be under pressure and ready for use while the other is filled.

In the accompanying drawing, A and B are submerged chambers into which the compressed air is to be admitted alternately. C is the compressed-air pipe leading from the source of air-supply. D E F G H I are pipes for conveying the compressed air. J is a five-way cock. It has one entrance-port communicating with C, constantly open, and four other ports communicating with the pipes D and E, which open connection with the pipe C or the open air, according to the position of the valve. K and L are two thumb-cocks leading to the pipes H and I. M and N are two air-cylinders, open at the bottom and provided with the pistons O. P and Q are the piston-rods, which are made to operate reciprocally by being attached to the ends of the beam R. S and T are sliding collars upon the piston-rods. They are pressed downward by the springs U and V. W and X are detent-levers for holding and releasing the collars S and T. Y and Z are slides for the piston-rods P and Q.

In the drawing, the cock J is shown in the proper position for admitting the compressed air from the pipe C to D, and to open communication from the pipe E to the open air by means of the aperture *a*. The cocks K and L are supposed to be slightly open, and to allow only a small portion of compressed air to pass, in comparison with the quantity passing through D F to the chamber A. In this position, the air rapidly escapes from the chamber B, through G and E, and it fills with water. The air can also pass out of the cylinder N through I L E. The compressed air, entering at C, drives the water out of the chamber A, and, by means of the small portion passing through the cock K, presses down the piston O. This raises the piston in the cylinder N, by means of the connecting-lever R. The collar S is held by the detent upon W until the piston O arrives near the bottom of the cylinder M, when an incline upon the under side of the piston pushes out the upper end of W and releases the collar S, which strikes the arm *c* of the cock J, and reverses it. Meanwhile the collar T has risen and locked onto the detent on X. The operation is now reversed. The compressed air enters through E and G to the chamber B, and escapes from the chamber A and the cylinder M, through D and the aperture *b*, to the open air. The water is forced from B, and the piston in the cylinder N descends, as has been described for the cylinder M, until it strikes the top of the lever X and releases the collar T, which, in its turn strikes the arm *d* of the cock J and again reverses it. In this manner the cock J is automatically operated by the minute portion of air passing through the cocks K and L.

What I claim as my invention is—

The combination of the devices M O P V S W, arranged in duplicate to move reciprocally, and operate the cock J by means of a small portion of the compressed air passing through it, substantially as herein described.

JARED A. AYRES.

Witnesses:
THEO. G. ELLIS,
WENDELL R. CURTIS.